Patented June 19, 1951

2,557,641

UNITED STATES PATENT OFFICE 2,557,641

POLYMER CURING PROCESS

Richard H. Dudley, Cranford, N. J., assignor to Standard Oil Development Company, a corporation of Delaware No Drawing. Application October 4, 1944, Serial No. 557,219

10 Claims. (Cl. 260—83.3)

This invention relates to the curing of plastic, elastic, rubbery organic bodies, relates particularly to the curing of such rubbery bodies by paraquinone dioxime substances, and relates especially to the prevention of premature curing by the use of high molecular weight amines.

A considerable number of substances are known which are called broadly vulcanizable rubbery substances, including the naturally occurring substance technically known as "caoutchouc" and the synthetic high molecular weight polymers including the polymers of butadiene, the polymers of butadiene with styrene and with acrylonitrile, prepared by an emulsion process, the low temperature interpolymer of isobutylene with a polyolefin monomer and a considerable number of others. These materials in the raw state are characterized by considerable plasticity, cold flow, and an unlimited elongation under tension. Accordingly, they require to be "cured" or chemically combined with a substance which will destroy the plasticity and cold flow and substitute for it a definite elongation limit and a definite tensile strength. This procedure yields from these materials structural elements which are characterized by substantial elongations ranging from 250% to 1200% under tension and forcible retraction upon release of tension to approximately original size and shape together with tensile strengths at break ranging from 500 lbs. to 4500 lbs. and an elongation at break ranging from 250% to 1200%. Thus these substances are grouped together under the generic name of "rubber" (the word being derived from the first use of the material to "rub out" pencil marks).

For the curing of these materials, sulfur was the first material used. It has since been found that the quinone dioximes, which are compounds containing a quinone di-imine nucleus, are excellent and very powerful curing agents, yielding very high grade structural elements of excellent strength, good elongation and tight cure. However, these agents, because of their high curing power, show a tendency towards premature curing, which is technically known as "scorchiness." That is, at the necessary milling temperatures, the curing reaction is so rapid that the material tends to cure and "set up" on the mill, whereafter it can no longer be molded and cured in the desired shape.

According to the invention, an amine is compounded into the rubber substance before the quinone dioxime is milled in. The preferred amine substance is octadecyl amine. At milling temperature, in the neighborhood of 180° F. to 227° F., no premature curing occurs in time intervals as long as an hour; whereas at 307° F. the curing occurs in the normal time.

The process of the invention thus adds to a rubbery polymer an amine, preferably a high molecular weight amine, and then a quinone dioxime substance to prevent scorchiness of the compound and permit of milling at normal milling temperature for relatively very long time intervals, without interference with the normal curing reaction. Other objects and details of the invention will be apparent from the following description.

The process is particularly applicable with the low temperature interpolymer of an isoolefin such as isobutylene or 2-methyl butene-1, or 2-methyl pentene-1, or the like; with a polyolefin having from 4 to 12 or 14 carbon atoms per molecule such as butadiene or isoprene or piperylene or dimethyl butadiene or myrcene or dimethallyl, or the like. In preparing this polymer, a major proportion of the isoolefin, preferably from 70% to 99% is mixed with a minor proportion of the polyolefin, preferably from 30% to 1%, and the mixture is cooled to a temperature ranging from —40° C. to —164° C. either by the application to the container of a refrigerating jacket containing a suitable low boiling refrigerant or by the admixture to the olefinic material of a hydrocarbon refrigerant such as liquid methane or liquid ethylene or liquid ethane or liquid propane, or liquid or solid carbon dioxide, or the like.

To the cold reaction mixture there is then added a Friedel-Crafts catalyst, preferably in solution in a low-freezing, non-complex forming solvent. For the catalyst, substantially any of the Friedel-Crafts catalysts disclosed by N. O. Calloway in his article on "The Friedel-Crafts Synthesis" printed in the issue of "Chemical Reviews" published for the American Chemical Society at Baltimore in 1935, in volume XVII, No. 3; the article beginning on page 327, the list being particularly well shown on page 375, may be used. For the catalyst solvent, any non-complex forming substance which is liquid at temperatures below 0° C., thereby being low-freezing, may be used. Preferred solvents are ethyl, methyl, and propyl, mono or poly halides. Alternatively, such substances as carbon disulfide and its analogues and homologues may be used. Also, with certain of the mixed halide catalysts, the low-freezing hydrocarbons show a sufficiently high solubility to be satisfactory catalyst solvents.

The catalyst solution is preferably applied in the form of a fine spray to the surface of the rapidly stirred, cold, olefinic mixture and the reaction proceeds promptly to yield an interpolymer of isoolefin and diolefin having a molecular weight between 20,000 and 150,000 and an iodine number between about 1 and 40 or 50. The reaction is an extremely rapid one and may be complete by the time the catalyst has been added. The reaction is ordinarily stopped short of complete polymerization of all the olefinic material present by limiting the amount of catalyst added, so that from 60 to 80% only of the olefinic material is polymerized. A convenient catalyst concentration is about 0.5% of aluminum chloride in the solvent and from 10 to 50 volumes of this catalyst solution per 100 volumes of mixed olefins yields an advantageous amount of polymerization. When the polymerization has reached the desired stage, the solid polymer is removed from the residual material and brought up to room temperature. It is then desirably washed with water on the open roll mill, preferably at temperatures somewhat above the boiling point of water in order to dry the polymer thoroughly. Thus prepared, the polymer is ready for the compounding step in which the present invention lies.

A convenient compounding recipe is as follows:

RECIPE I

| | Parts by weight |
|---|---|
| Isobutylene-isoprene copolymer | 100 |
| Stearic acid | 0 - 3 |
| Zinc oxide | 1 - 10 |
| Carbon black | 10 - 200 |
| Paraquinone dioxime | 0.5 - 3 |
| $Pb_3O_4$ | 2 - 8 |
| High molecular weight amine | 0.25 - 5 |

This recipe is conveniently prepared by treating the polymer on an open roll mill at a temperature in the neighborhood of 180° F. to 230° F., milling the polymer until it is sufficiently warmed up to "band" on the rolls. The zinc oxide, stearic acid, carbon black, and amine are then added and well worked in. The paraquinone dioxime is added last but without cooling the mill and the milling may be continued for as long a time as desired to obtain a thoroughly homogeneous mixture, without any premature curing or "setting up"; that is, without any scorchiness. The compound is then ready for molding and it may be extruded or calendered or otherwise treated as a preliminary to the molding and curing step; and in these treatments it may be safely heated to a convenient softening temperature without danger of scorch.

The process is similarly applicable to emulsion polymers of diolefins such as butadiene, isoprene, piperylene, dimethyl butadiene and the like, either alone or with copolymers such as styrene or acrylonitrile or the like. In the preparation of these polymers, the diolefin, either alone or with the desired copolymerizate, is mixed with from 1 to 3 or 4 volumes of water containing a soap or emulsifier and a peroxide polymerization catalyst such as sodium persulfate, hydrogen peroxide, ammonium perborate and the like. The material is then stirred vigorously to maintain the liquid hydrocarbons in emulsion form and the stirring is continued at temperatures ranging from 30° C. to 60° C. or 70° C. for time intervals ranging from 1 or 2 hours to several days, according to the temperature, whereafter the volatile unpolymerized materials are removed, the emulsion coagulated and the polymer dried and prepared for the compounding step of the present invention.

A convenient compounding recipe is as follows:

RECIPE II

| | Parts by weight |
|---|---|
| Diolefinic polymer | 100 |
| Stearic acid | 0 to 5 |
| Zinc oxide | 1 to 10 |
| Carbon black | 5 to 50 |
| Paraquinone dioxime | 0.5 to 3 |
| $Pb_3O_4$ | 2 to 8 |
| High molecular weight amine | 0.25 to 5.0 |

This recipe is conveniently prepared on the roll mill as with Recipe I.

Similarly, caoutchouc such as "Upriver Para" grade or similar material may be compounded by a recipe similar to Recipe II, the caoutchouc being substituted for the diolefinic polymer.

Example 1

A series of compounds were prepared according to the following recipes:

RECIPE III

| Stock No | 1 | 2 | 4 | 4 | 5 |
|---|---|---|---|---|---|
| Isobutylene-diolefin copolymer | 100 | 100 | 100 | 100 | 100 |
| Sulfur | 2 | 2 | 2 | 2 | 2 |
| EPC Black | 20 | 20 | 20 | 20 | 20 |
| SRF Black | 30 | 30 | 30 | 30 | 30 |
| Paraquinone dioxime | 1 | 1 | 1 | 1 | 1 |
| $Pb_3O_4$ | 5 | 5 | 5 | 5 | 5 |
| Softening Oil | 4 | 4 | 4 | 4 | 4 |
| Octadecyl Amine | | 0.25 | 0.5 | 0.75 | 1.0 |

These compounds were separately tested for scorchiness by heating them for 20, 40, and 60 minutes at 227° F. Test specimens were cut from the various treated samples and tested for tensile strength, modulus at 500% extension, and for elongation at break. The following Table I, shows the resulting values:

TABLE I

[Scorch cures at 227° F.; Tensile—Mod. at 500%—Elongation.]

| Minutes | Tensile | Modulus at 500% | Elongation at break | Tensile | Modulus at 500% | Elongation at break | Tensile | Modulus at 500% | Elongation at break | Tensile | Modulus at 500% | Elongation at break | Tensile | Modulus at 500% | Elongation at break |
|---|---|---|---|---|---|---|---|---|---|---|---|---|---|---|---|
| Cure 20' at 227° F | 50 | 0 | 1,100+ | 0 | 0 | 1,100+ | 0 | 0 | 1,100+ | 0 | 0 | 580 | 0 | 0 | 340 |
| Cure 40' | 280 | 110 | 950 | 90 | 0 | 1,100+ | 0 | 0 | 1,100+ | 0 | 0 | 900 | 0 | 0 | 680 |
| Cure 60' | 380 | 110 | 930 | 160 | 0 | 1,100+ | 0 | 0 | 1,100+ | 0 | 0 | 1,100+ | 0 | 0 | 700 |

These values show the scorchiness of the material in the absence of the amine, and the very great improvement and reduction in scorchiness from the presence of the amines. In the absence of amine, relatively high tensile strength and modulus are developed at processing temperatures such as 227° F. and elongation is lowered. Such a compound is a short, horny, and dry stock which cannot be further processed by extrusion or milling or calendering and cannot be further shaped; whereas all of the other compounds containing the amine have low tensile and modulus and high elongation even after heating to 227° F. and can be further treated as desired.

Other samples from the same compoundings were then cured at 312° F. for time intervals of 4-6-8-10- and 30 minutes and the tensile strength, modulus at 300% extension and elongation at break were determined, yielding the results in the following table:

TABLE II

[Cures at 312° F.; Tensile—Mod. at 300%—Elongation.]

| Minutes | Tensile | Modulus at 300% | Elongation at break | Tensile | Modulus at 300% | Elongation at break | Tensile | Modulus at 300% | Elongation at break | Tensile | Modulus at 300% | Elongation at break | Tensile | Modulus at 300% | Elongation at break |
|---|---|---|---|---|---|---|---|---|---|---|---|---|---|---|---|
| Cure 4' at 312° F | 710 | 150 | 770 | 500 | 90 | 880 | 270 | 0 | 1,000 | Undercured | | | Undercured | | |
| Cure 6' | 1,030 | 220 | 780 | 820 | 160 | 810 | 470 | 60 | 870 | do | | | Do. | | |
| Cure 8' | 1,270 | 240 | 800 | 1,090 | 170 | 800 | 670 | 110 | 800 | 430 | 50 | 840 | 350 | 50 | 750 |
| Cure 10' | 1,400 | 340 | 700 | 1,230 | 300 | 690 | 800 | 170 | 700 | 610 | 100 | 710 | 540 | 50 | 740 |
| Cure 30' | 1,800 | 700 | 600 | 1,760 | 610 | 640 | 1,810 | 500 | 690 | 1,680 | 440 | 730 | 1,680 | 440 | 700 |

Nevertheless, the presence of the amine does not interfere to any substantial extent with the normal curing reaction of the polymer and the tensile strengths, elongations and moduli of the compounds containing the amine are very slightly different from those of the compound free from the amine, after curing for 10 and 30 minutes. The only effect of the amine is to delay the start of curing somewhat, as is shown by the 4 minute and 6 minute cures.

Example 2

Other amines are similarly useful. A series of compounds were prepared according to the following recipes:

RECIPE IV

| Stock | 11 | 12 | 13 | 14 | 15 | 16 | 17 | 18 | 19 |
|---|---|---|---|---|---|---|---|---|---|
| Polymer | 100 | 100 | 100 | 100 | 100 | 100 | 100 | 100 | 100 |
| Sulfur | 2 | 2 | 2 | 2 | 2 | 2 | 2 | 2 | 2 |
| SRF Black (Gastex) | 30 | 30 | 30 | 30 | 30 | 30 | 30 | 30 | 30 |
| EPC Black (Cabot #9) | 20 | 20 | 20 | 20 | 20 | 20 | 20 | 20 | 20 |
| Paraquinone dioxime | 2 | 2 | 2 | 2 | 2 | 2 | 2 | 2 | 2 |
| $Pb_3O_4$ | 10 | 10 | 10 | 10 | 10 | 10 | 10 | 10 | 10 |
| Dibenzyl amine | | 0.5 | 1.0 | 1.5 | 2.0 | | | | |
| A butyraldehyde aniline condensation product | | | | | | | 0.5 | 1.0 | 1.5 | 2.0 |
| Softening Oil | 4 | 4 | 4 | 4 | 4 | 4 | 4 | 4 | 4 |

These compounds were scorch tested and cured as in Example 1 to yield inspection results set out in the following Tables III and IV:

TABLE III

[Tensile—Mod. at 500%—Elongation; 227° F. cures.]

| Minutes | 11 | 12 | 13 | 14 | 15 | 16 | 17 | 18 | 19 |
|---|---|---|---|---|---|---|---|---|---|
| Cure 40' at 227° | 260-140-810 | 200- 93-1,040 | 140-60-1,100 | 50-50-1,100 | 50-40-1,100 | 200-100-1,000 | 50-0-1,100 | 0-0-1,100 | |
| Cure 60' | 330-160-890 | 270-120-1,060 | 140-70-1,100 | 70-60-1,100 | 40-40-1,100 | 250-110-1,020 | 50-0-1,100 | 0-0-1,100 | 0-0-1,100 |

TABLE IV

[Tensile—Mod. at 300%—Elongation; 320° F. cures.]

| Minutes | 11 | 12 | 13 | 14 | 15 | 16 | 17 | 18 | 19 |
|---|---|---|---|---|---|---|---|---|---|
| Cure 4' at 320° | 850-190-620 | 820-220-670 | 630-150-700 | 480- 60-750 | 380- 70-730 | 800-160-630 | 660-170-600 | 510-110-620 | 440- 60-730 |
| Cure 8' | 1,290-390-580 | 1,330-310-650 | 990-280-610 | 870-160-650 | 830-160-690 | 1,360-330-620 | 1,265-330-620 | 960-330-600 | 740-200-630 |
| Cure 16' | 1,630-810-440 | 1,610-600-550 | 1,620-510-600 | 1,470-380-610 | 1,290-290-580 | 1,780-620-520 | 1,580-570-570 | 1,480-440-630 | 1,040-340-570 |
| Cure 32' | 1,920-990-520 | 1,960-890-520 | 2,020-750-600 | 1,900-570-620 | 1,850-450-620 | 1,980-810-570 | 1,960-710-550 | 1,740-580-610 | 1,650-370-700 |

These results similarly show the efficacy of dibenzyl amine.

Example 3

Other complex amines such as 2,4-diamino diphenyl amine are equally effective as is shown in the present example. A series of compounds were prepared according to the following recipe:

TABLE V

| Stock | 21 | 22 | 23 | 24 | 25 | 26 | 27 | 28 | 29 |
|---|---|---|---|---|---|---|---|---|---|
| Polymer | 100 | 100 | 100 | 100 | 100 | 100 | 100 | 100 | 100 |
| Sulfur | 2 | 2 | 2 | 2 | 2 | 2 | 2 | 2 | 2 |
| SRF Black (Gastex) | 30 | 30 | 30 | 30 | 30 | 30 | 30 | 30 | 30 |
| EPC Black (Cabot #9) | 20 | 20 | 20 | 20 | 20 | 20 | 20 | 20 | 20 |
| Paraquinone Dioxime | 2 | 2 | 2 | 2 | 2 | 2 | 2 | 2 | 2 |
| $Pb_3O_4$ | 10 | 10 | 10 | 10 | 10 | 10 | 10 | 10 | 10 |
| A Butyraldehyde aniline condensation product | | 0.5 | 1.0 | 1.5 | 2.0 | | | | |
| Diamino diphenyl amine | | | | | | | 0.5 | 1.0 | 1.5 | 2.0 |
| Softening Oil | 4 | 4 | 4 | 4 | 4 | 4 | 4 | 4 | 4 |

2,557,641

These compounds were tested for scorchiness and for curing as in Example 1 to yield the following inspection record:

TABLE VI

[Tensile—Mod. at 500%—Elongation; 227° F. cures.]

| Minutes | 21 | 22 | 23 | 24 | 25 | 26 | 27 | 28 | 29 |
|---|---|---|---|---|---|---|---|---|---|
| Cure 40'. | 230-110-860 | 90-40-1,100 | 40-0-1,100 | 40-0-1,100 | 50-0-1,100 | 40-0-1,100 | 90-40-1,100 | 40-0-1,100 | 40-0-1,100 |
| Cure 60'. | 320-150-780 | 90-40-1,100 | 50-0-1,100 | 50-0-1,100 | 50-0-1,100 | 50-0-1,100 | 110-60-1,100 | 60-0-1,100 | 60-0-1,100 |

TABLE VII

[Tensile—Mod. at 300%—Elongation; 320° F. cures.]

| Minutes | 21 | 22 | 23 | 24 | 25 | 26 | 27 | 28 | 29 |
|---|---|---|---|---|---|---|---|---|---|
| Cure 8'. | 1,480-630-530 | 1,420-500-550 | 1,320-460-590 | 1,320-430-590 | 1,160-480-550 | 1,500-550-600 | 1,280-420-600 | 1,200-320-620 | 950-350-570 |
| Cure16'. | 1,970-930-520 | 1,780-810-520 | 1,770-780-540 | 1,910-740-620 | 1,880-810-590 | 1,930-770-560 | 1,900-660-610 | 1,640-620-580 | 1,560-540-630 |
| Cure32'. | 2,120-1,260-440 | 2,100-1,020-540 | 2,010-940-540 | 2,020-970-530 | 2,040-870-560 | 2,090-1,000-550 | 1,960-950-550 | 1,730-730-560 | 1,500-680-570 |

These examples show only the use of paraquinone dioxime as the curing agent. The invention is not, however, limited to paraquinone dioxime alone, but is applicable to all of the quinone dioxime type curing agents as shown in the patent to Harry L. Fisher No. 2,170,191, on August 22, 1939. This patent shows a wide range of dioxime type curing agents, with all of which the amine material of the present invention is applicable to reduce such tendency towards scorchiness as is found to occur when they are used.

The foregoing examples show representative amines but the invention is not limited to these amines only. As far as present knowledge goes, any mono or poly amine which has a boiling point somewhat above the rubber processing temperatures; that is, above about 230° F., is more or less effective. That is, diethanolamine having two carbon atoms and a boiling point at 172° C. is useful although not as effective as the octadecyl amine. As far as present knowledge goes, all of the higher amines are useful for this purpose and effective.

Thus the process of invention reduces the scorchiness of compounds containing a low temperature interpolymer of isobutylene with a polyolefin in the presence of paraquinone dioxime, by the addition to the mixture of an amine which is non-volatile at processing temperature.

While there are above described but a limited number of embodiments of the process of the invention, it is possible to provide still other embodiments without departing from the inventive concept herein disclosed and it is, therefore, desired that only such limitations be imposed on the appended claims as are stated therein or required by the prior art.

The invention claimed is:

1. The method of processing and curing a low temperature interpolymer of isobutylene in major proportion with a polyolefin having 4 to 14 carbon atoms per molecule, comprising the steps in combination of admixing octadecyl amine with said interpolymer, then admixing paraquinone dioxime with said interpolymer containing in admixture a sufficient amount of the octadecyl amine to prevent precuring of the interpolymer by the dioxime at processing temperatures up to about 230° F., processing the resulting mixture at temperatures of about 180° F. to 230° F., and thereafter curing the interpolymer by the dioxime at a temperature above 275° F.

2. A composition of matter comprising an isobutylene-diolefin copolymer having a molecular weight within the range between 20,000 and 150,000 and an iodine number within the range between 1 and 50, together with reactivity with sulfur in a curing reaction to produce a tensile strength within the range between 500 pounds and 4500 pounds per square inch, and an elongation at break within the range between 250% and 1200%, octadecyl amine within the range between 0.25 and 5 parts per hundred of polymer, and paraquinone dioxime within the range between 0.5 and 3 parts per hundred of polymer in the absence of sulfur.

3. In processing a vulcanizable rubbery substance selected from the group consisting of naturally occurring caoutchouc, and synthetic high molecular weight homopolymers of butadiene and copolymers of butadiene with styrene and with acrylonitrile prepared by an emulsion process, and low temperature interpolymers of isobutylene with a polyolefin monomer of 4 to 14 carbon atoms, which contains significant amounts of reactive unsaturation and is curable to a material having a tensile strength within the range between 500 pounds and 4500 pounds per square inch, and an elongation at break within the range between 250% and 1200%, with a curing agent that contains a quinonoid nucleus, the improvement which comprises compounding into the rubbery substance said quinonoid curing agent within the range between 0.5 part and 3 parts per hundred parts of rubbery substance in the absence of sulfur and an amine selected from the group consisting of octadecyl amine, dibenzyl amine, 2.4-diamino diphenyl amine, and a butyraldehyde-aniline condensation product, said amine being admixed with the vulcanizable rubbery substance in a proportion within the range between 0.25 part and 5 parts per hundred parts of rubbery substance which prevents premature curing and scorching of the rubbery substance during processing at temperatures in the range of 180° F. to 230° F.

4. In a process of processing and curing a vulcanizable rubbery substance selected from the group consisting of naturally occurring caoutchouc, and synthetic high molecular weight homopolymers of butadiene and copolymers of butadiene with styrene and with acrylonitrile prepared by an emulsion process, and low temperature interpolymers of isobutylene with a polyolefin monomer of 4 to 14 carbon atoms, which contains significant amounts of reactive unsaturation and is curable to a material having a tensile strength within the range between 500 pounds and 4500 pounds per square inch, and an elongation at break within the range between 250% and 1200% with a curing agent having quinonoid nucleus, the improvement which comprises the steps of adding and milling into the rubbery substance in the absence of sulphur, an amine selected from the group consisting of octadecyl amine, dibenzyl amine, 2.4-diamino diphenyl amine, and a butyraldehyde-aniline condensation product, said amine being admixed in a proportion within the range between 0.25 part and 5 parts per hundred parts of rubbery substance to prevent premature curing and scorching of the rubbery substance during admixing of the curing agent and processing, admixing and milling into the rubbery substance mixed with the amine said quinonoid curing agent in the proportion within the range of 0.5 part to 3 parts per hundred parts of rubbery substance, processing the resulting mixture containing the vulcanizable rubbery substance mixed with the amine and curing agent at temperatures between 180° F. and 230° F. while retaining the original physical characteristics of the rubbery substance, and thereafter heating said resulting mixture to a temperature about 275° F. until the rubbery substance is cured by said curing agent.

5. In the method as described in claim 4, said vulcanizable rubbery substance being caoutchouc.

6. In the method as described in claim 4, said vulcanizable rubbery substance being a diolefinic emulsion polymer.

7. In the method as described in claim 4, said vulcanizable rubbery substance being a butadiene-containing polymer.

8. In the method as described in claim 4, said vulcanizable rubbery substance being a co-polymer of butadiene and styrene.

9. In the method as described in claim 4, said vulcanizable rubbery substance being a low temperature interpolymer of a major proportion of isobutylene with a minor proportion of a polyolefin having 4 to 14 carbon atoms, inclusive, per molecule and a molecular weight above 20,000.

10. In processing and curing a vulcanizable rubbery substance selected from the group consisting of naturally occurring caoutchouc, and synthetic high molecular weight homopolymers of butadiene and copolymers of butadiene with styrene and with acrylonitrile prepared by an emulsion process, and low temperature interpolymers of isobutylene with a polyolefin monomer of 4 to 14 carbon atoms, which contains significant amounts of reactive unsaturation and is curable to a material having a tensile strength within the range between 500 pounds and 4500 pounds per square inch, and an elongation at break within the range between 250% and 1200% with paraquinone dioxime, the improvement which comprises the steps of compounding into said rubbery substance octadecyl amine and paraquinone dioxime within the range between 0.5 part and 3 parts per hundred parts of rubbery substance in the absence of sulfur, the octadecyl amine being admixed with said rubbery substance in a proportion within the range between 0.25 and 5 parts per hundred parts of rubbery substance which prevents premature curing and scorching of the rubbery substance by the paraquinone dioxime during processing at temperatures up to about 230° F., and thereafter curing said rubbery substance by the paraquinone dioxime mixed therewith in the presence of the octadecyl amine.

RICHARD H. DUDLEY.

REFERENCES CITED

The following references are of record in the file of this patent:

UNITED STATES PATENTS

| Number | Name | Date |
|---|---|---|
| 2,170,191 | Fisher | Aug. 22, 1939 |
| 2,311,004 | Thomas et al. | Feb. 16, 1943 |
| 2,391,742 | Roberts | Dec. 25, 1945 |
| 2,393,321 | Haworth | Jan. 22, 1946 |